(12) United States Patent
Kropla

(10) Patent No.: US 9,302,714 B2
(45) Date of Patent: Apr. 5, 2016

(54) HYBRID COMPONENT AND METHOD FOR MANUFACTURING A HYBRID COMPONENT

(75) Inventor: Oliver Kropla, Rosengarten (DE)

(73) Assignee: Daimler AG, Stuttgart (DE)

( * ) Notice: Subject to any disclaimer, the term of this patent is extended or adjusted under 35 U.S.C. 154(b) by 410 days.

(21) Appl. No.: 13/499,425

(22) PCT Filed: Sep. 22, 2010

(86) PCT No.: PCT/EP2010/005798
§ 371 (c)(1),
(2), (4) Date: Apr. 20, 2012

(87) PCT Pub. No.: WO2011/038853
PCT Pub. Date: Apr. 7, 2011

(65) Prior Publication Data
US 2012/0192654 A1  Aug. 2, 2012

(30) Foreign Application Priority Data

Oct. 2, 2009  (DE) .................. 10 2009 048 185

(51) Int. Cl.
| | | |
|---|---|---|
| *G01B 7/16* | (2006.01) | |
| *B62D 25/14* | (2006.01) | |
| *B60R 21/0136* | (2006.01) | |
| *B62D 29/00* | (2006.01) | |
| *B62D 41/00* | (2006.01) | |
| *B62D 21/17* | (2006.01) | |

(52) U.S. Cl.
CPC .......... *B62D 25/145* (2013.01); *B60R 21/0136* (2013.01); *B62D 21/17* (2013.01); *B62D 29/001* (2013.01); *B62D 29/004* (2013.01); *B62D 41/00* (2013.01)

(58) Field of Classification Search
CPC .......... G01B 7/16; B62D 25/14; B62D 25/00; B62D 29/00; B62D 41/00; B60K 37/00; B60R 21/0136
USPC .................. 73/760–786; 29/897; 296/193.02
See application file for complete search history.

(56) References Cited

U.S. PATENT DOCUMENTS

| | | | |
|---|---|---|---|
| 4,420,251 A * | 12/1983 | James et al. ..................... 356/32 |
| 2007/0296116 A1* | 12/2007 | Huonker ....................... 264/263 |
| 2008/0122265 A1* | 5/2008 | Meier ........................... 296/204 |

FOREIGN PATENT DOCUMENTS

| | | |
|---|---|---|
| AT | 009 699 U1 | 2/2008 |
| DE | 101 20 138 A1 | 8/2002 |
| DE | 101 45 357 C1 | 5/2003 |
| DE | 10 2004 025 245 A1 | 12/2005 |
| EP | 1 844 989 A1 | 10/2007 |

OTHER PUBLICATIONS

PCT/ISA/237 Form (Six (6) pages).
International Search Report including English language translation dated Jan. 21, 2011 (Eight (8) pages).

* cited by examiner

*Primary Examiner* — Lisa Caputo
*Assistant Examiner* — Brandi N Hopkins
(74) *Attorney, Agent, or Firm* — Crowell & Moring LLP

(57) ABSTRACT

A hybrid component supporting component for a motor vehicle includes a base component made of a metallic material, at least some parts of which are provided with a plastic material. The hybrid component includes a detection device having at least one conductor element by means of which a deformation of the hybrid component can be detected.

27 Claims, 2 Drawing Sheets

HYBRID COMPONENT AND METHOD FOR MANUFACTURING A HYBRID COMPONENT

BACKGROUND AND SUMMARY OF THE INVENTION

Figure 1:
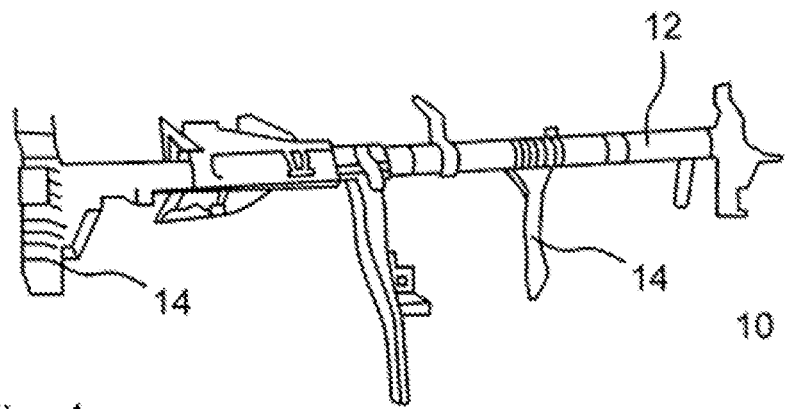

The invention relates to a hybrid component a method for manufacturing such a hybrid component.

Generic components for a car body are sufficiently well known. They are designed as plastic/metal hybrid components or made from a fiber-reinforced plastic material and perform important supporting functions in the passenger car. While the car travels, such a component is subjected to continuously varying loads which result in the elastic deformation of the component. Excessive loading, for example in an accident or as a result of advanced ageing at the end of the service life of the component, may lead to a permanent deformation of the component or affect the function of the component.

Such damage cannot be detected easily when examining the car. Moreover, hybrid components used as structural components of the car body are often only accessible, if at all, after the removal of whole system, which results in high service or repair costs.

Exemplary embodiments of the present invention are directed to developing a hybrid component and a method for manufacturing a hybrid component of the type referred to above, so that a deformation of the hybrid component can be detected in a simple way.

According to the invention, such a hybrid component, in particular a supporting component, for a motor vehicle, having at least one base component made of a metallic material, at least parts of which are provided with a plastic material, comprises a detection device having at least one conductor element by means of which a deformation of the hybrid component can be detected. Such a deformation may be a plastic or an elastic deformation of the hybrid component. By providing at least one conductor element, any deformation or damage can be detected in a cost-effective way during servicing of the vehicle or even in the operation of the motor vehicle without having to remove the hybrid component or a component which includes the hybrid component. This reduces service costs significantly because the component has only to be removed if it has actually been damaged and/or deformed, i.e., if the hybrid component recognizably no longer fulfils its function. Such deformation or damage may also be caused by the advanced age of the hybrid component; this, too, can be detected in the hybrid component according to the invention with its detection device.

The at least one conductor element is advantageously located at particularly critical or highly loaded points of the hybrid component, which points may, for example, be identified in the testing process or by means of computer-aided simulation.

A reaction of the conductor element to the deformation or damage of the hybrid component may be active or passive. In an active reaction, a signal may, for example, be output by the detection device and displayed in the interior or in the cockpit of the motor vehicle. In a passive reaction, the deformation or damage of the hybrid component may, for example, be detected only during a read-out from a fault memory in a service process, for example in a workshop, and such deformation or damage may then be displayed on a service unit.

The hybrid component offers the basic advantage of being very light-weight and being capable of fulfilling numerous functions as a result of the fact that suitable holders, receptacles, mounting locations and the like are provided by the plastic material. The detection of any damage or deformation is particularly advantageous, because the failure of such a component can result in cost-intensive and potentially safety-relevant consequential damage.

In an advantageous embodiment of the invention, the conductor element is an electric conductor, which allows for a cost-effective and at the same time efficient detection of a potential damage to the hybrid component.

If the conductor element is an optical conductor, this embodiment offers the advantage that any damage or deformation can be detected fast and accurately.

Therefore, deformation and/or damage of the hybrid component can, for example, be detected by a rupture of, break of, and/or change in the electric or optical transmission behavior of the conductor element. The electric conductor is advantageously represented by the base component of the hybrid component itself. This means that the substantially metallic base component is itself designed as a conductor element, for example as an earth conductor, the deformation or damage of which involves a change in its electric behavior and can therefore be detected. To provide electric conductivity, suitable measures have to be taken if the base component consists essentially of aluminum, so that a passivating oxide layer of the aluminum is permanently stripped away, broken up or otherwise removed. This embodiment offers the advantage that the number of hybrid components is reduced by omitting additional conductor elements, which in turn reduces the overall costs and the weight of the hybrid component.

If the plastic material of the hybrid component substantially consists of a fiber-reinforced plastic material, this has the advantage of providing an extremely rigid and light-weight hybrid component which, owing to a defined fiber orientation or a defined mutual orientation of several fiber layers, can be designed to meet highly specific requirements.

In an advantageous embodiment of the invention, the conductor element is arranged on the surface of the plastic material of the hybrid component. In this case, the hybrid component can, even after its production, be fitted in a simple and cost-effective way with the conductor element for creating the detection device, whereby the overall costs of the hybrid component can be kept within a low range. In this embodiment, too, a simple digital 0-1 evaluation is made possible as a result of the rupture and/or break of the conductor element. This detection may be based on a comparison of a set resistance to an actual resistance of the conductor element or of a desired optical transmission behavior to an actual optical transmission behavior.

The conductor element may be a wire or as a foil and placed on at least a part of the plastic material of the hybrid component and/or the base component, for example by bonding, so that the conductor element can be positioned on the said highly loaded or critical points of the hybrid component in a cost-effective way.

If at least parts of the conductor element are accommodated by the plastic material, a particularly firm connection between the conductor element and the hybrid component is advantageously achieved, which reduces the risk that the conductor element might separate from the hybrid component.

In a further, particularly advantageous, embodiment of the invention at least parts of the conductor element are integrated into fibers of the hybrid component, in particularly woven in or integrated by other means. This again results in a particularly firm connection between the conductor element and the hybrid component, and it creates a connection between the conductor element and the hybrid component without any additional fastening means.

Arranging a plurality of conductor elements in a tabular matrix allows the precise position of the damage to be determined. As a result, it is possible to replace the damaged hybrid components in a controlled and therefore cost-effective manner, and conclusions can be drawn in regard to a loading of the hybrid component; these conclusions can, for example, be taken into consideration when further developing the hybrid component with the aim of avoiding consequential damages.

The invention further includes a method for manufacturing a hybrid component, in particular a supporting component, for a motor vehicle, wherein at least parts of a base component made of a metallic material are provided with a plastic material, the invention providing that the hybrid component comprises a detection device having at least one conductor element, by means of which a deformation of the hybrid component can be detected. As has been stated already in the context of the hybrid component, the method according to the invention allows a deformation or damage of the hybrid component to be detected in a simple and therefore cost-effective manner.

An electric conductor and/or an optical conductor may be provided as a conductor element, because such conductors are highly accurate and reliable and promote a fast response of the detection device.

If at least parts of the conductor element are placed on a surface of the plastic material of the hybrid component and/or on the base component, and if the conductor element is formed using a three-dimensional injection-molded circuit carrier process, this advantageously allows design of complex geometries of the conductor element, in particular of an electric conductor, so that the conductor element can be placed at virtually any location of the hybrid component in order to detect its damage or deformation. It should be noted that the three-dimensional injection-molded circuit carrier process referred to above is also described as 3D molded interconnect devices method (3D-MID).

In an advantageous embodiment of the invention, the conductor element is formed in a laser direct structuring process. This, too, allows for a variable design of the conductor element at highly loaded and therefore critical points of the hybrid component while being cost-effective in its implementation, which means low overall costs for the hybrid component or the method for manufacturing the hybrid component.

Additionally, the conductor element can be formed in an embossing and/or a two-component injection molding process, which likewise allows a great variety of geometries to be produced in a cost-effective manner.

If the conductor element is formed by spraying on a conductor of conductive powder, this can be achieved, for example, using a flame spraying process and/or a cold gas spraying process. In this way, the conductor element can be applied, for example, to the existing plastic material of the hybrid component, cost-effectively in virtually any form.

If the plastic material of the hybrid component is substantially a fiber-reinforced plastic material, at least parts of the conductor element can be integrated into fibers of the plastic material, in particularly woven or otherwise incorporated into these fibers, resulting in the firm connection between the conductor element and the hybrid component which has already been described in this context.

In this embodiment, the base component with a fiber part into which the conductor element has been integrated, in particular woven or otherwise incorporated, can be placed in an injection mold and at least partially enclosed in a plastic material by injection molding. This contributes, for example, to an increase in the rigidity of the hybrid component and/or to an increase in the scope of its functionality, because the plastic material may, for example, form fasteners for mounting further components in the injection molding process. This subsequent process step creates a cost-effective and quick method by means of which a light-weight but nevertheless rigid structural component in the form of a hybrid component which can fulfill a variety of functions can be produced.

The fiber part may, for example, be a fibrous mat into which the conductor element is woven and then placed, together with the base component, in an injection mould to be embedded in a plastic material. Alternatively, a fibrous body can be used which essentially has a fiber structure forming a body, for example a fiber tube, into which the conductor element is woven or integrated in the manufacturing process. The base component is then provided with this fibrous body and placed in the injection mould to be embedded in the plastic material.

The base component referred to above may, for example, be a component or tube produced by hydroforming. It is therefore advantageous if the base component is produced in a hydroforming process followed by embedding in a plastic material in an injection molding process, the hydroforming process and the injection molding process advantageously being carried out using one and the same tool.

By means of the various embodiments of the invention and/or by combining these embodiments, a hybrid component allowing structural health monitoring (SHM) is created in a cost-effective manner. This allows monitoring of the structural condition of the hybrid component. As described above, a manufacture of the hybrid component and an integration of sensors in the form of at least one electric or optical sensor are made cost-effective or even cost-neutral. In addition, the component can easily be connected to a diagnostic system of a passenger car, so that a damage or deformation of the hybrid component can be detected offline, i.e., as the described passive reaction in a service process, and/or online, i.e., as an active reaction in the diagnostic system of the passenger car.

In addition, the evaluation of sensor signals of the conductor element is easy. There is no need for complex calculations, for calibration or for references to production data. The detection device described above is independent of vehicle and component variants, of component shapes and the like, which allows for large production runs, thereby reducing costs.

It should further be noted that such a hybrid component may be a structural component such as a cross-member, in particular for a front module of a passenger car. The cross-member may alternatively be a cockpit cross-member or a part of a rear panel, a door etc.

The hybrid component according to the invention monitors its own condition in a quasi-active manner, and any deviation from the desired condition, for example caused by damage owing to excessive loading, is indicated by a signal. Such deviations, which may also be caused by other changes in rigidity, allow unambiguous conclusions with respect to the quality of the component and thus to its behavior in a crash. The signals emitted by the hybrid component are acquired, stored and evaluated, so that they can have a positive influence on any subsequent further development of the hybrid component. It is possible, for example, to record the local frequency of damage and to interpret these facts suitably when redesigning the component. In addition, the signals can indicate the need for the replacement or repair of the component. In the same way, the sensors described above allow for a transition to active components in which the operating principle of the sensors can be reversed, so that they can be used as actuators if required. For this purpose, however, only specific sensors, such as piezoelectric elements, are suitable. A conductor element could also be used as a heating element for heating the component, for example to increase its elasticity.

In this context, it is also possible to use piezoelectric sensors in place of or in addition to the at least one optical or electric sensor to detect any damage or deformation of the hybrid component.

Further advantages, features and details of the invention can be derived from the following description of several preferred embodiments and from the drawings. The features and combinations of features referred to above and the features and combinations of features mentioned in the description of the figures and/or shown in the figures only can be used not only in the stated combination, but also on other combinations or individually, without leaving the scope of the invention.

BRIEF DESCRIPTION OF THE DRAWING FIGURES

Figure 2:
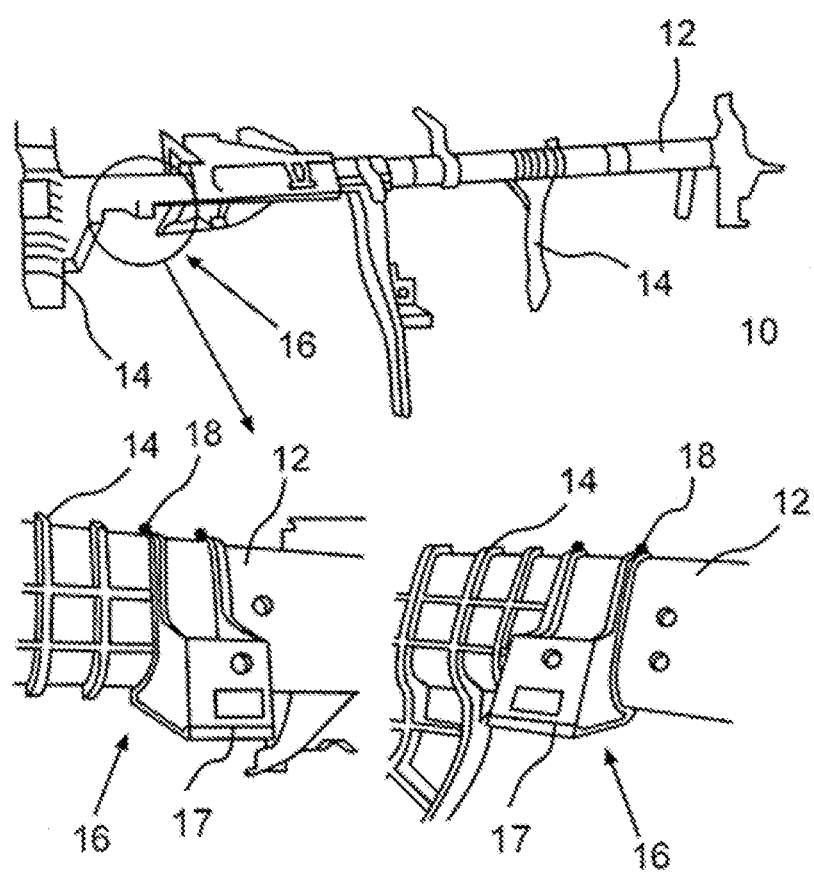
Figure 3:
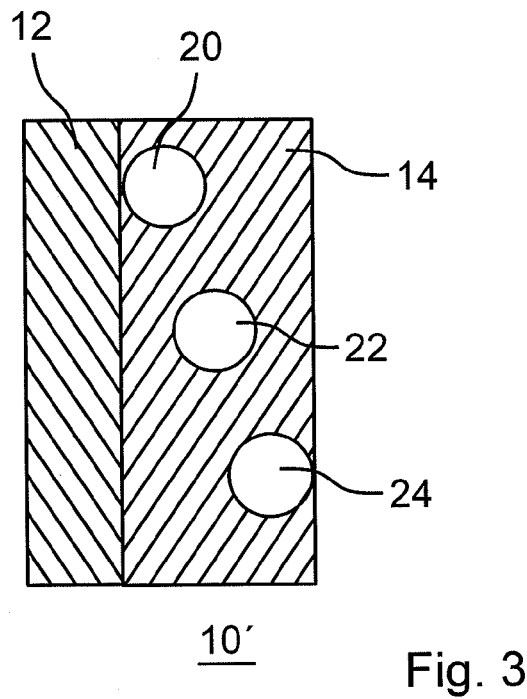
Figure 4:
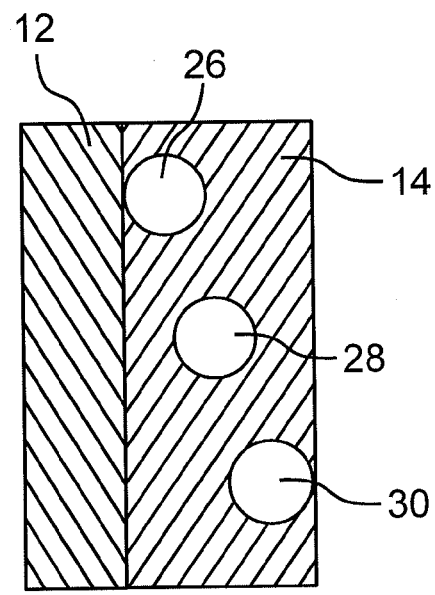
Figure 5:
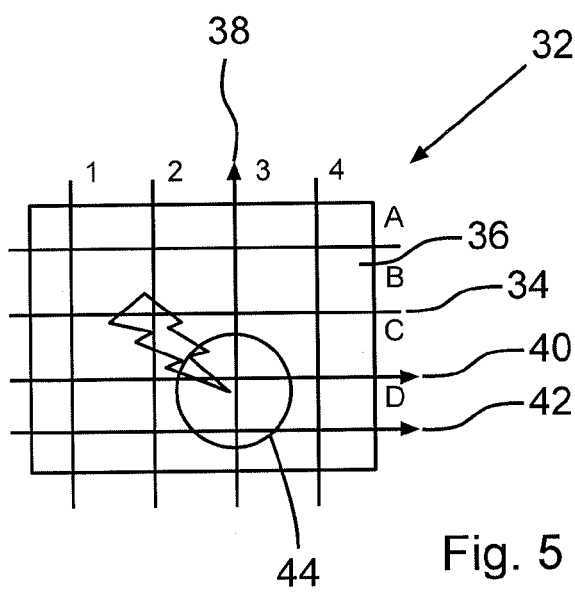

Of the drawing,

FIG. 1 is a perspective view of a plastic/metal cross-member for a passenger car, in which a detection device for detecting deformations of the cross-member is provided, which detection device comprises an electric conductor which is applied to the plastic material and by means of the break, rupture or change in the electric resistance of which a deformation of the cross-member can be detected;

FIG. 2 provides two enlarged perspective views of a highly loaded point of the cross-member according to FIG. 1, where an electric conductor has been applied to the plastic material for detecting any deformation;

FIG. 3 is a diagrammatic cross-section of a plastic/metal cross-member, in the plastic material of which electric conductors are provided for detecting a deformation of the cross-member;

FIG. 4 is a diagrammatic cross-section of a plastic/metal cross-member, in the plastic material of which optical conductors are provided for detecting a deformation of the cross-member; and FIG. 5 is a diagrammatic view of a tabular matrix arrangement of electric and/or optical conductors according to FIGS. 3 and 4 for detecting and locating a deformation of the cross-member according to the preceding figures.

DETAILED DESCRIPTION

While FIGS. 1 and 2 illustrate a possible embodiment of an arrangement of an electric conductor on a plastic/metal cross-member for detecting a deformation or damage of the cross-member, FIGS. 3 to 5 illustrate possibilities of applying such electric and/or optical conductors for detecting the deformation or damage of the plastic material of the cross-member or of arranging them in a matrix for locating the deformation or damage.

Identical elements are identified by the same reference numbers in the figures.

FIG. 1 shows a plastic/metal hybrid component in the form of a cross-member 10 for a motor vehicle, which hybrid component comprises a base component 12 made of a metallic material, parts of which have been supplemented by a plastic material 14 to provide the said plastic/metal hybrid component. The cross-member 10 reinforces the passenger car and accommodates components located in its region.

As a deformation or a damage of the cross-member 10 can occasionally affect safety-relevant aspects of the passenger car, detection of such deformation or damage, for example caused by the application of force in a crash or by advanced ageing, is desirable without having to remove the cross-member 10 from the passenger car, which would involve costs.

For this reason, as shown in FIG. 2, a detection device 17 having an electric conductor 18 has been applied to the plastic material 14 of the cross-member 10 in a highly loaded region 16 of the cross-member 10. As a result of excessive deformation or of a damage of the cross-member 10, the electric conductor 18 ruptures or breaks or at least changes its electric resistance, so that such an excessive deformation or damage of the cross-member 10 can be detected.

FIG. 3 shows a plastic/metal hybrid component in the form of a cross-member 10' which, like the cross-member 10 according to FIG. 1, comprises the base component 12 substantially made of a metallic material, which has been supplemented by the plastic material 14 to provide the said plastic/metal hybrid component. In order to detect a deformation or a damage of the cross-member 10', a detection device having a plurality of electric conductors 20, 22, 24 is provided; these are incorporated, i.e., embedded in a manner of speaking, into the plastic material 14 of the cross-member 10'.

FIG. 4 shows a further embodiment of a cross-member 10", which provides an alternative to the above cross-members 10 and 10' and which likewise comprises the base component 12 substantially made of a metallic material, which has been supplemented by the plastic material 14 to provide a plastic/metal hybrid component. A plurality of optical conductors 26, 28 and 30 of a detection device have been incorporated into the plastic material 14 of the cross-member 10" by means of the rupture, break, and/or change of the optical transmission behavior of which a deformation or damage of the cross-member 10" can be detected. The optical conductors 26, 28 and 30 are so-called fiber-optic sensors.

FIG. 5 shows a tabular matrix arrangement 32 of a detection device, which may comprise, for example, the above electric conductors 18, 20, 22, 24 or optical conductors 26, 28, 30. A sensor matrix 34 formed in this way is applied to a plastic/metal hybrid component 36, for example to a cross-member 10, 10' or 10" of the preceding figures, and permits a precise location of a damage of the plastic/metal hybrid component 36, which is indicated by the directional arrows 38, 40 and 42 and by a circle 44.

The embodiments illustrated in the figures create a monitoring facility for a structural condition (structural health monitoring) of the respective components that obviates the removal of the component from the overall system if there is only a suspicion or for checking only. A cost-intensive removal is therefore required only if the respective component is in fact damaged or deformed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A hybrid supporting component for a motor vehicle, comprising:
   a base component made of a metallic material;
   a plastic material that is injection-molded to the metallic material of the base component; and
   a detection device that is disposed at least in the plastic material, the detection device having at least one conductor element that detects a deformation between two points within the hybrid supporting component.

2. The hybrid supporting component according to claim 1, wherein the conductor element is an electric conductor.

3. The hybrid supporting component according to claim 2, wherein the electric conductor is part of the base component of the hybrid supporting component.

4. The hybrid supporting component claim 1, wherein the conductor element is an optical conductor.

5. The hybrid supporting component claim 1, wherein the plastic material substantially is a fiber-reinforced plastic material.

6. The hybrid supporting component claim 1, wherein at least parts of the conductor element are arranged on the plastic material of the hybrid supporting component.

7. The hybrid supporting component claim 1, wherein the conductor element is a wire or a foil.

8. The hybrid supporting component claim 1, wherein at least parts of the conductor element are accommodated in the plastic material of the hybrid supporting component.

9. The hybrid supporting component claim 1, wherein at least parts of the conductor element are arranged on the base component of the hybrid supporting component.

10. The hybrid supporting component claim 1, wherein at least parts of the conductor element are woven into fibers of the plastic material.

11. The hybrid supporting component claim 1, wherein the at least one conductor element is a plurality of conductor elements arranged in a tabular matrix.

12. A method for manufacturing a hybrid supporting component for a motor vehicle, the method comprising:
providing at least one base component made of a metallic material;
injection molding a plastic material to the metallic material of the at least one base component; and
providing a detection device at least in the plastic material, the detection device having at least one conductor element by means of which a deformation between two points within the hybrid supporting component is detected.

13. The method according to claim 12, wherein an electric conductor is provided as conductor element.

14. The method according to claim 12, wherein an optical conductor is provided as conductor element.

15. The method according claim 12, wherein the base component is provided with the plastic material in an injection molding process.

16. The method according claim 12, wherein at least parts of the conductor element are arranged on a surface of the plastic material of the hybrid supporting component.

17. The method according claim 12, wherein at least parts of the conductor element are arranged on the base component of the hybrid supporting component.

18. The method according claim 12, wherein the at least one conductor element is formed in a three-dimensional injection-molded circuit carrier process.

19. The method according claim 12, wherein the at least one conductor element is formed in a laser direct structuring process.

20. The method according claim 12, wherein the at least one conductor element is formed in an embossing process.

21. The method according claim 12, wherein the at least one conductor element is formed in a two-component injection molding process.

22. The method according claim 12, wherein the at least one conductor clement is formed by spraying on a conductor of conductive powder.

23. The method according to claim 22, wherein the conductor is sprayed on in a flame spraying process.

24. The method according to claim 22, wherein the conductor is sprayed on in a cold gas spraying process.

25. The method according claim 12, wherein the plastic material is a substantially fiber-reinforced plastic material.

26. The method according claim 12, wherein at least parts of the at least one conductor element are woven into fibers of the plastic material.

27. The method according to claim 26, wherein the base component, together with a fiber part into which the at least one conductor element is integrated, is placed in an injection mold and at least partially enclosed in the plastic material by injection molding.

* * * * *